(12) United States Patent
Scillieri et al.

(10) Patent No.: US 11,809,603 B2
(45) Date of Patent: Nov. 7, 2023

(54) SYSTEMS AND METHODS FOR REAL-TIME ENCRYPTION OF SENSITIVE DATA

(71) Applicant: The Western Union Company, Denver, CO (US)

(72) Inventors: Anthony Scillieri, Pequannock, NJ (US); Soumi Sarkar, Wyckoff, NJ (US); Dmitriy Borinshteyn, Mendham, NJ (US); Vikram Bhagat, Montvale, NJ (US); Manjeet Kishan Kola, Montvale, NJ (US)

(73) Assignee: The Western Union Company, Denver, CO (US)

( * ) Notice: Subject to any disclaimer, the term of this patent is extended or adjusted under 35 U.S.C. 154(b) by 0 days.

(21) Appl. No.: 17/029,315

(22) Filed: Sep. 23, 2020

(65) Prior Publication Data
US 2022/0092221 A1 Mar. 24, 2022

(51) Int. Cl.
| | |
|---|---|
| *G06F 21/62* | (2013.01) |
| *H04L 9/40* | (2022.01) |
| *H04L 9/30* | (2006.01) |
| *G06F 21/60* | (2013.01) |

(52) U.S. Cl.
CPC ........ *G06F 21/6263* (2013.01); *G06F 21/602* (2013.01); *H04L 9/3073* (2013.01); *H04L 63/0428* (2013.01)

(58) Field of Classification Search
CPC . G06F 21/6263; G06F 21/602; H04L 9/3073; H04L 63/0428
See application file for complete search history.

(56) References Cited

U.S. PATENT DOCUMENTS

| | | | | |
|---|---|---|---|---|
| 10,699,023 B1* | 6/2020 | Mokashi | ............. | G06F 21/6245 |
| 10,715,497 B1* | 7/2020 | Maeng | .................... | H04L 63/12 |
| 2006/0005017 A1* | 1/2006 | Black | .................. | G06F 21/6245 |
| | | | | 713/165 |
| 2006/0075228 A1* | 4/2006 | Black | .................... | H04L 63/104 |
| | | | | 713/167 |
| 2007/0182714 A1* | 8/2007 | Pemmaraju | ........... | G06F 21/602 |
| | | | | 345/168 |
| 2009/0172389 A1* | 7/2009 | Maor | .................. | H04L 63/1441 |
| | | | | 713/150 |

(Continued)

*Primary Examiner* — Saleh Najjar
*Assistant Examiner* — Devin E Almeida
(74) *Attorney, Agent, or Firm* — Kilpatrick Townsend & Stockton LLP

(57) ABSTRACT

Techniques and systems for protecting data input to a web-based application are provided herein. A method may include executing, within a web browser being executed by a computer system, a web-based application. Execution of the web-based application may include tagging one or more data fields as sensitive and fetching a public key from a remote server system. The method may include identifying, by the web-based application, a keystroke entry being input into the one or more data fields tagged as sensitive within the web-based application. Prior to storing the keystroke entry in memory mapped to the web browser, the method may include encrypting by the web-based application, the keystroke entry using the fetched public key to generate an encrypted entry. The web browser may store the encrypted entry to memory. Importantly, the keystroke entry may never be stored to the memory of the web browser in an unencrypted form.

20 Claims, 8 Drawing Sheets

(56) References Cited

U.S. PATENT DOCUMENTS

| | | | |
|---|---|---|---|
| 2010/0061556 A1* | 3/2010 | Whitehead | H04L 63/0428 380/278 |
| 2010/0195825 A1* | 8/2010 | Cini | G06F 21/83 380/52 |
| 2011/0055922 A1* | 3/2011 | Cohen | H04L 63/1475 726/22 |
| 2012/0137371 A1* | 5/2012 | Geva | G06F 21/6263 726/26 |
| 2013/0091351 A1* | 4/2013 | Manges | H04L 63/0428 713/153 |
| 2018/0026947 A1* | 1/2018 | Haworth | H04L 63/06 713/168 |
| 2021/0279370 A1* | 9/2021 | Pandit | G06F 21/6263 |

* cited by examiner

SYSTEMS AND METHODS FOR REAL-TIME ENCRYPTION OF SENSITIVE DATA

BACKGROUND

For a web application, when data is entered by a user into the application's user interface, the data can be available in unencrypted form within the browser's process memory. Even if data is to be encrypted, the entered data by the user is first transmitted to memory mapped to the browser and stored before encryption. When the entered data contains sensitive data, the sensitive data may be stored and available in unencrypted form in the browser's process memory. Having unencrypted sensitive data in the browser's memory may expose the sensitive data, and the user, to security risks. If the terminal is compromised, by for example, a memory scrapper tool, then the sensitive data may be discovered. Discovery of sensitive data may pose security risks for the user, an agent associated with the web-based application, and/or an entity hosting the transaction. For example, discovery or exposure of the sensitive data may lead to privacy violations, such as for example, Personally Identifiable Information (PII) or Payment Card Industry (PCI) violations.

SUMMARY

Techniques disclosed herein described systems, non-transitory computer-readable mediums, and methods for protecting data input to a web-based application. A method may include executing, within a web browser being executed by a computer system, a web-based application. Executing the web-based application may include tagging one or more data fields as sensitive and fetching a public key from a remote server system. Exemplary data fields that may be tagged as sensitive may include one or more of a credit card number data field, a bank account data field, and a password data field. In some embodiments, fetching the public key from the remote server system may include requesting, by the remote server system, a key pair from a key management system. The key pair may include the public key and a corresponding private key. Fetching the public key may further include generating, by the key management system, the key pair and transmitting, by the remote server system, the public key to the web-based application being executed within the web browser.

The method may also include identifying, by the web-based application being executed within the web browser, a keystroke entry being input to the one or more data fields tagged as sensitive within the web-based application. Prior to storing the keystroke entry in memory mapped to the web browser, the method may include encrypting, by the web-based application being executed within the web browser, the keystroke entry using the fetched public key to generate an encrypted entry. Optionally, encrypting, by the web-based application being executed within the web browser, the keystroke entry using the fetched public key to generate the encrypted entry may further include adding a salt value to the keystroke entry to form the encrypted entry. After encrypting the keystroke entry, the method may further include storing, by the web browser, the encrypted entry to memory. Importantly, the keystroke entry may never be stored to memory of the web browser in an unencrypted form.

The method may also include presenting, by the web browser, a representation of the keystroke entry in the data field tagged as sensitive. Further, the method may include transmitting, by the web-based application being executed within the web browser, the encrypted entry to the remote server system.

In some embodiments, the method may include decrypting, by the remote server system, the encrypted entry to generate a decrypted entry. Optionally, decrypting, by the remote server system, the encrypted entry to generate the decrypted entry may include transmitting, by the web-based application being executed within the web browser, an identifier associated with the fetched public key along with the encrypted entry to the remote server system. The remote server system may identify the private key based on the identifier associated with the fetched public key. The method may then include decrypting, by the remote server system, the encrypted entry using the private key to generate the decrypted entry. Optionally, the method may include removing, by the remote server system, a salt value from the decrypted entry.

After decrypting, by the remote server system, the encrypted entry to generate a decrypted entry, the method may include determining, by the remote server system, a portion of the decrypted entry to return to the web-based application. Further, the method may include transmitting, by the remote server system, the portion of the decrypted entry to the web-based application. In some embodiments, transmitting, by the remote server system, the portion of the decrypted entry to the web-based application may further include tagging, by the remote server system, the portion of the decrypted entry as sensitive. If a portion of the decrypted entry is tagged as sensitive, the remote server system may generate a sensitive representation of the portion of the decrypted entry. The method may then include transmitting, by the remote server system, the sensitive representation of the portion of the decrypted entry to the web-based application.

A system for protecting data input to a web-based application is also provided herein. The system may include one or more processors and memory readable by the one or more processors and that may store therein a set of instructions which, when executed by the one or more processors, causes the system to execute, within a web browser being executed by the system, a web-based application. Execution of the web-based application may include tagging one or more data fields as sensitive and fetching a public key from a remote server system. Exemplary data fields that may be tagged as sensitive may include one or more of a credit card number data field, a bank account data field, and a password data field.

The set of instructions may also cause the system to identify, by the web-based application being executed within the web browser, a keystroke entry being input to the one or more data fields tagged as sensitive within the web-based application. Further, the set of instructions may cause the system to, prior to storing the keystroke entry in memory mapped to the web browser, encrypt, by the web-based application being executed within the web browser, the keystroke entry using the fetched public key to generate an encrypted entry. Optionally, the instructions may further cause the system to add, by the web-based application being executed within the web browser, a salt value to the keystroke entry to form the encrypted entry.

Additionally, the set of instructions may cause the system to store, by the web browser, the encrypted entry to memory. Importantly, the keystroke entry may never be stored to memory of the web browser in an unencrypted form. The set of instructions may also cause the system to present, by the web browser, a representation of the keystroke entry in the data field tagged as sensitive. Further, the instructions may cause the system to transmit, by the web-based application being executed within the web browser, the encrypted entry to the remote server system.

In some embodiments, system may further include a remote server system. The remote server system may be configured to request a key pair from a key management system. The key pair may include a public key and a corresponding private key. The remote server system may also be configured to transmit the public key to the web-based application being executed within the web browser.

In some embodiments, the remote server system may be configured to decrypt the encrypted entry to generate a decrypted entry. Optionally, the remote server system may be configured to determine a portion of the decrypted entry to return to the web-based application and transmit the portion of the decrypted entry to the web-based application. In some cases, to transmit the portion of the decrypted entry, the remote server system may be further configured to tag the portion of the decrypted entry as sensitive. The remote server system may be configured to generate a sensitive representation of the portion of the decrypted entry and transmit the sensitive representation of the portion of the decrypted entry to the web-based application.

In some cases, to decrypt the encrypted entry to generate the decrypted entry, the remote server system may be further configured to receive an identifier associated with the fetched public key along with the encrypted entry. Based on the identifier associated with the fetched public key, the remote server system may be configured to identify a private key. The remote server system may then be configured to decrypt the encrypted entry using the private key to generate the decrypted entry. Optionally, a salt value may be removed from the decrypted entry.

A non-transitory processor-readable medium, comprising processor-readable instructions for protecting data input to a web-based application is also provided herein. The instructions may cause one or more processors to execute, within a web browser, a web-based application. Execution of the web-based application may include tagging one or more data fields as sensitive and fetching a public key from a remote server system. Exemplary data fields that may be tagged as sensitive may include one or more of a credit card number data field, a bank account data field, and a password data field.

The instructions may further cause the one or more processors to identify, by the web-based application being executed within the web browser, a keystroke entry being input to the one or more data fields tagged as sensitive within the web-based application. Prior to storing the keystroke entry in memory mapped to the web browser, the instructions may cause the one or more processors to encrypt, by the web-based application being executed within the web browser, the keystroke entry using the fetched public key to generate an encrypted entry. Optionally, the instructions to encrypt, by the web-based application being executed within the web browser, the keystroke entry using the fetched public key to generate the encrypted entry may further cause the one or more processors to add a salt value to the keystroke entry to form the encrypted entry.

The instructions may further cause the one or more processors to store, by the web browser, the encrypted entry to memory. Importantly, the keystroke entry may never be stored to memory of the web browser in an unencrypted form. Further, the instructions may cause the one or more processors to present, by the web browser, a representation of the keystroke entry in the data field tagged as sensitive and transmit, by the web-based application being executed within the web browser, the encrypted entry to the remote server system.

In some embodiments, the instructions may further cause the one or more processors to decrypt the encrypted entry to generate a decrypted entry. Optionally, the instructions to decrypt the encrypted entry to generate the decrypted entry may further cause the one or more processors to transmit, by the web-based application being executed within the web browser, an identifier associated with the fetched public key along with the encrypted entry to the remote server system. Then the one or more processors may identify a private key based on the identifier associated with the fetched public key. The instructions may then cause the one or more processors to decrypt the encrypted entry using the private key to generate the decrypted entry. Optionally, the instructions may further cause the one or more processors to remove a salt value from the decrypted entry.

Optionally, the instructions may cause the one or more processors to determine a portion of the decrypted entry to return to the web-based application and transmit the portion of the decrypted entry to the web-based application. In some embodiments, the instructions to transmit the decrypted entry to the web-based application may further cause the one or more processors to tag the portion of the decrypted entry as sensitive. The one or more processors may then generate a sensitive representation of the portion of the decrypted entry. The sensitive representation of the portion of the decrypted entry may then be transmitted to the web-based application.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Embodiments disclosed herein relate generally to techniques and systems for protecting data input to a web-based application. More specifically, embodiments described herein disclose systems and processes for real-time encryption data input into a user interface of a web-based application being executed on a web browser. Traditionally, when data input into a web-based application is to be encrypted, the input data is transmitted and stored within the memory of the web browser before any encryption process is performed. The stored input data within the browser memory is therefore unencrypted or "in clear form" within the browser memory. When the input data contains sensitive information, such as for example financial information or personal information, storing the input data in its clear form in the browser memory may pose a variety of security risks.

Techniques and systems disclosed herein may provide for increased security over conventional encryption methods because they provide for real-time encryption of sensitive data input to a web-based application. For example, when the input data is sensitive, the data input to the web-based application may never be stored in an unencrypted form (e.g., in clear form) within the web browser's memory. Instead, each keystroke entry input into the web-based application may be encrypted prior to storing the keystroke entry in the system's memory mapped or assigned to the web browser. In this manner, any sensitive data input into the web-based application is only stored in the web browser's memory in encrypted form. In fact, in some embodiments, sensitive data input into the web-based application or sensitive data associated with the data input may never be stored in the web browser's memory in an unencrypted form. Additionally, the techniques and systems described herein provide a cost effective approach for data protection that is easy to implement via a web-based application which does not require additional software or hardware to be installed on a computer device. Accordingly, the techniques and systems described herein may provide cost effective and efficient means for increasing security of data management and transactions.

Figure 1:
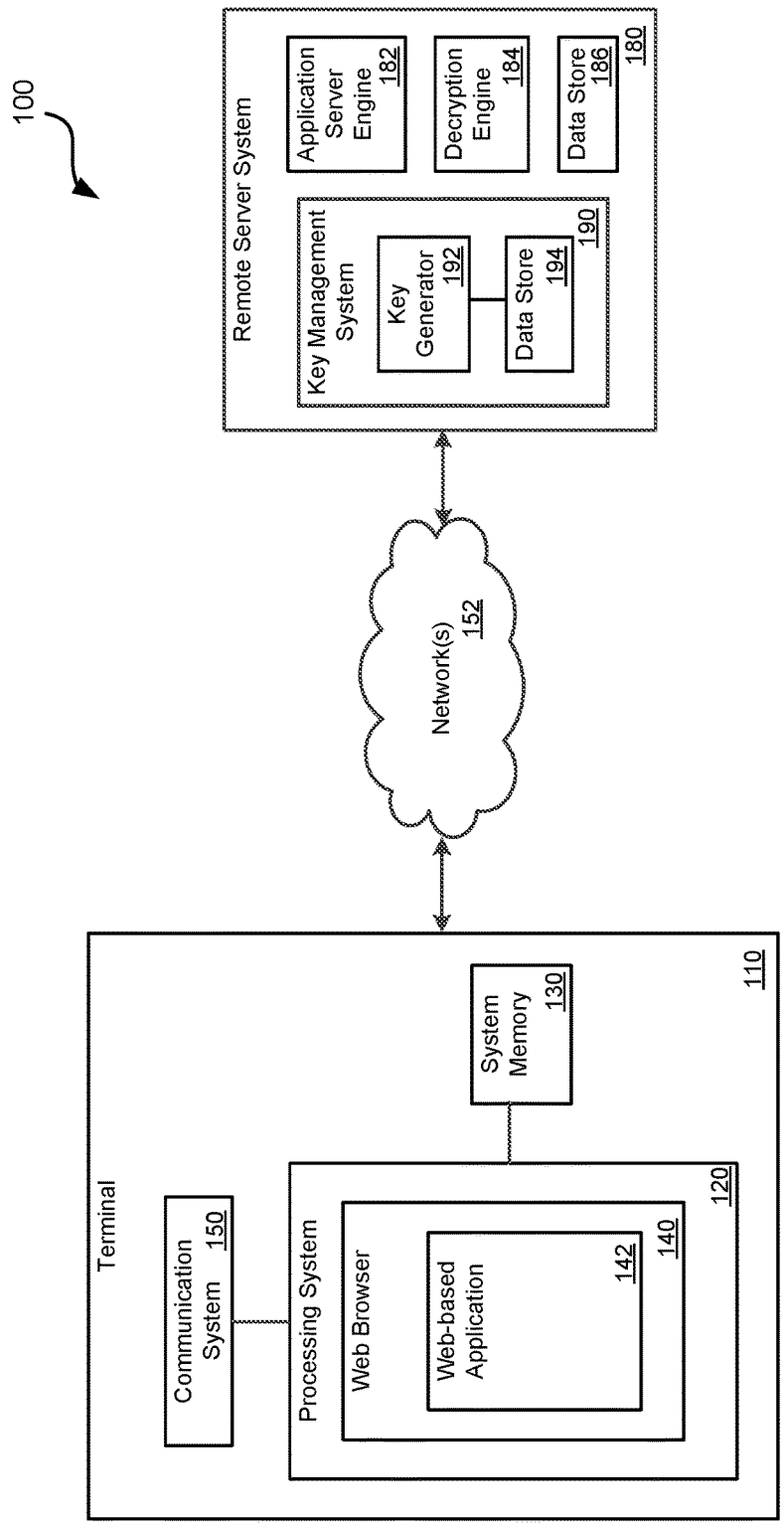
FIG. 1 illustrates a system for protecting data input to a web-based application including a terminal, a network, and a remote server system, according to some embodiments described herein.

FIG. 1 illustrates a system 100 for protecting data input into a web-based application in accordance with one or more embodiments described herein. As shown, system 100 may include a terminal 110, a remote server system 180, and one or more communication networks 152. Terminal 110 may be a computer system, such as for example, a desktop computer system, a laptop, a mobile device, or the like.

Terminal 110 may include a processing system 120 and a system memory 130. Processing system 120 may include one or more processors. The processor(s) may include single or multicore processors. The processors may operate under the control of software stored in the associated system memory 130. Depending on the configuration and type of processor(s), system memory 130 may include volatile memory (such as random access memory (RAM), and/or non-volatile storage drives, such as read-only memory (ROM, flash memory, etc.). In some cases, system memory 130 may contain data and/or program modules that are immediately accessible to and/or presently being operated and executed by the one or more processors of processing system 120. In some implementation, the system memory 130 may include multiple different types of memory, such as static random access memory (SRAM) or dynamic random access memory (DRAM). In some implementations, a basic input/output system, (BIOS), containing the basic routines that help to transfer information between elements within terminal 110, such as during start-up, may typically be stored in non-volatile storage drives. By way of example, and not limitation, system memory 130 of terminal 110 may include application programs, such as server applications or operating systems.

In some embodiments, system memory 130 may include computer-readable storage media. The computer-readable storage media may contain program code, or portions of program code, and may include any appropriate media known or used in the art, including storage media and communication media, such as but not limited to, volatile and non-volatile, removable and non-removable media implemented in any method or technology for storage and/or transmission of information. This can include tangible computer-readable storage media, such as RAM, ROM, electronically erasable programmable ROM (EEPROM), flash memory or other memory technology, CD ROM, digital versatile disk (DVD), or other optical storage, magnetic cassettes, magnetic tapes, magnetic disk storage or other magnetic storage devices, or other tangible computer readable media, such as data signals, data transmission, or any other medium which can be used to transmit the desired information and which can be accessed by terminal 110 or processing system 120 of terminal 110.

By way of example, the computer-readable storage media may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media may include, but is not limited to, Zip® drives, flash memory cards, universal serial bus (USB) flash drives, secure digital (SD) cards, DVD disks, digital video tape, and the like. Computer-readable storage media may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data.

System memory 130 may include one or more sets of memory that may store instructions, that when executed by processing system 120 may cause system 100 to perform one or more functions described herein. For example, processing system 120 may execute a web browser 140 on terminal 110. Processing system 120 may further execute a web-based application 142 within web browser 140. Web browser 140 and web-based application 142 will be described in further detail with reference to FIGS. 2A and 2B below.

Terminal 110 may also include a communication system 150. Communication system 150 may include one or more communications subsystems for providing a communication interface from terminal 110 and external computing systems, such as remote server system 180 via one or more communication networks 152, which may include local area networks (LANs), wide area networks (WANs) (e.g., the Internet), and various wireless telecommunications networks. The communications subsystem may include, for example, one or more network interface controllers (NICs), such as Ethernet cards, Asynchronous Transfer Mode NICs, Token Ring NICs, and the like, as well as one or more wireless communications interfaces, such as wireless network interface controllers (WNICs), wireless network adapters, and the like. Additionally and/or alternatively, the communications subsystem may include one or more modems (telephone, satellite, cable, ISDN), synchronous or asynchronous digital subscriber line (DSL) units, FireWire® interfaces, USB® interfaces, and the like. In some cases, the communications subsystem also may include radio frequency (RF) transceiver components for accessing wireless voice and/or data networks (e.g., using cellular telephone technology, advanced data network technology, such as 3G, 4G, 5G, or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem may be detachable components coupled to communication system 150 via a computer network, a FireWire® bus, or the like, and/or may be physically integrated into communication system 150. In some cases, the communications subsystem also may be implemented in whole or in part by software.

In some embodiments, the communications subsystem may also receive input communication in the form of structured and/or unstructured data feeds, event streams, event updates, and the like, on behalf of one or more users who may use or access terminal 110. In some cases, communications subsystem may be configured to receive data in the form of continuous data streams, which may include event streams of real-time events and/or event updates. The communications subsystem may output such structured and/or unstructured data feeds, event streams, event updates, and the like to one or more data stores that may be in communication with one or more streaming data source computers coupled to terminal 110.

Due to the ever-changing nature of computers and networks, the description of terminal 110 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

System 100 may also include remote server system 180. Remote server system, 180 may include one or more processors, such as those described above with references to processing system 120. The processors of remote server system 180 may operate under the control of software or instructions stored in one or more sets of memory. Remote server system may include a memory system including computer-readable storage media. For example, depending on the configuration and type of processor(s), instructions for remote server system 180 may be stored in volatile memory (such as random access memory (RAM), and/or in non-volatile storage drives, such as read-only memory (ROM, flash memory, etc.). Remote server system 180 may also include one or more data stores, such as data store 186. Data store 186 may include one or more sets of memory.

Remote server system 180 may support encryption of data input into the web-based application 142 before the data input is stored in system memory 130. To support encryption of data input into web-based application 142, remote server system 180 may provide web-based application 142 with encryption information, such as an encryption key, encryption library, and the like. For example, as described by the embodiments herein, remote server system 180 may provide web-based application 142 with a public key. To provide web-based application 142 with a public key, remote server system 180 may include a key management system 190. Key management system 190 may include a key generator 192 and a data store 194. Key generator 192 may generate a public and private key pair. The public and private key pair may be used as part of an asymmetric encryption method known as public key encryption. An exemplary asymmetric encryption method may include RSA PKI encryption. Public key encryption uses two separate keys instead of one shared one for encryption: a public key and a private key. The public key is disseminated and available to anyone for use. The private key, on the other hand, is kept private. Data encrypted with the public key can only be decrypted with the private key, and the data encrypted by with the private key can only be decrypted with the public key.

In some embodiments, key generator 192 may also generate an identifier associated with the public and private key pair such that key management system 190 may identify the private key associated with the public key based on the identifier. Data store 194 may store the public and private key pair, along with the associated identifier. When remote server system 180 decrypts an encrypted entry, an identifier transmitted along with the encrypted entry from communication network(s) 152 may be used to determine an associated private key within data store 194 for decryption.

Remote server system 180 may also include a decryption engine 184. Decryption engine 184 may use the private key identified by key management system 190 to decrypt an encrypted entry received by remote server system 180. Once the encrypted entry is decrypted by decryption engine 184, the decrypted entry may be stored in data store 186.

Remote server system 180 may also include an application server engine 182. Application server engine 182 may correspond to web-based application 142 and store instructions and related data used to execute web-based application 142. Remote server system 180 may also include data stores which can be accessed and used to update web-based application 142. In some embodiments, key management system 190, decryption engine 184, and/or data store 186 may be part of remote server system 180, while in other embodiments key management system 190, decryption engine 184, and/or data store 186 may be remote to remote server system 180.

Figure 2A:
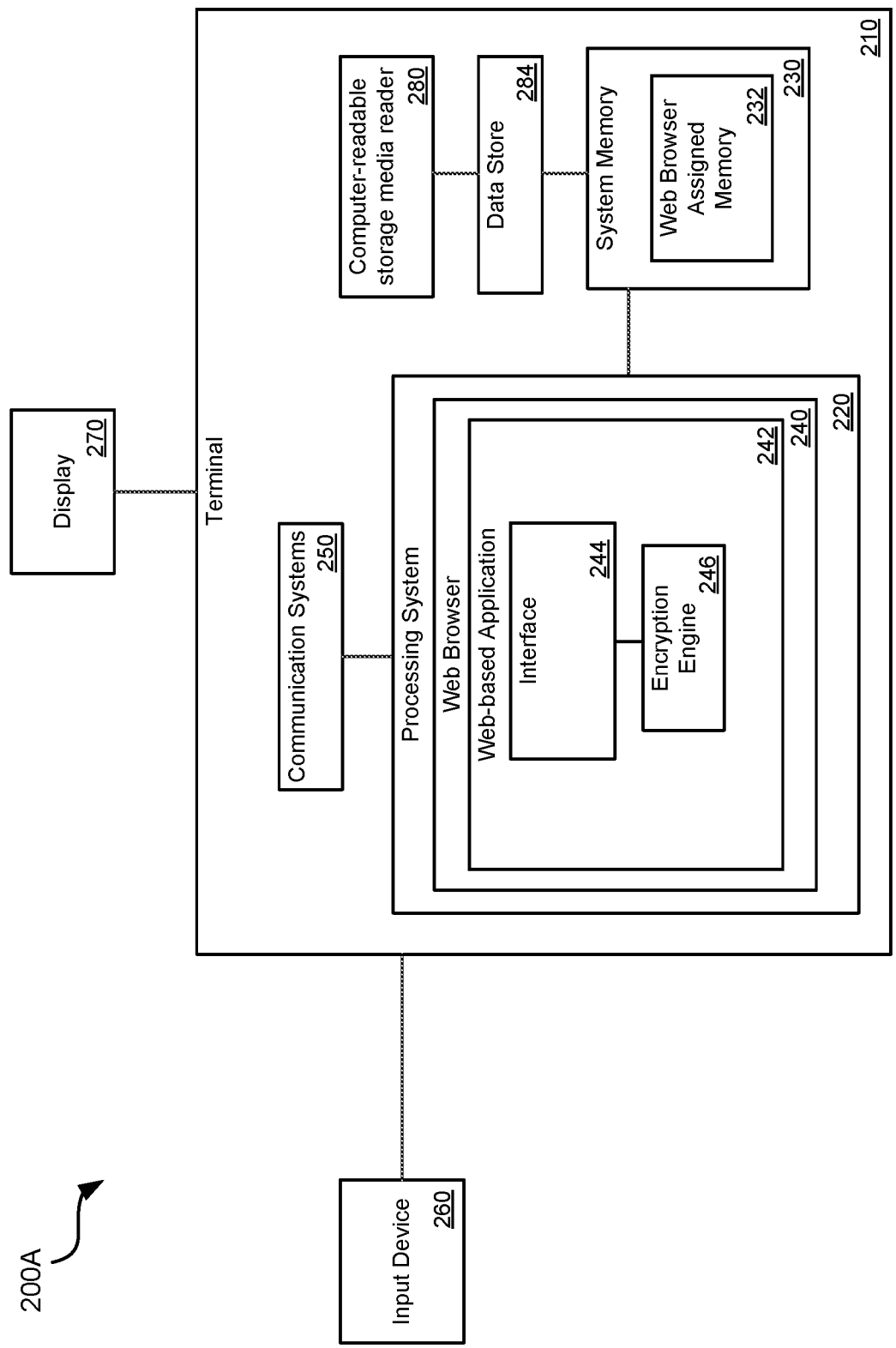
FIG. 2A illustrates a computer system executing, within a web browser, a web-based application for protecting data input to the web-based application, according to some embodiments described herein.

Turning now to FIG. 2A, computer system 200 is provided. Computer system 200 may represent a detailed view of terminal 110, presented as terminal 210, according to some embodiments described herein. Computer system 200 may include various hardware elements that can be electrically coupled together. The hardware elements may include processing system 220, one or more input devices 260 (e.g., a mouse, a touchscreen, a keyboard, a card reader, etc.), and one or more output devices (e.g., display 270, a printer, etc.). For example, in some embodiments, input device 260 may be a keyboard through which a user inputs individual keystrokes to input data. Processing system 220 may be the same or similar to processing system 120. Computer system 200 may also include a system memory 230 and one or more data stores 284. System memory 230 may be the same or similar to system memory 130, as described above. Data store 284, by way of example, may include disk drives, optical storage devices, solid-state storage devices such as a random access memory ("RAM") and/or a read-only memory ("ROM"), which can be programmable, flash-updateable and/or the like.

Computer system 200 may additionally include a computer-readable storage media reader 280 and a communication system 250. Communication system 250 may be the same as communication system 150 and can include, for example, a modem, a network card (wireless or wired), an infra-red communication device, Bluetooth™ device, cellular communication device, and the like.

Computer-readable storage media reader 280 may be connected to a computer-readable storage medium, together (and, optionally, in combination with data store 284) comprehensively representing remote, local, fixed, and/or removable storage devices plus storage media for temporarily and/or more permanently containing computer-readable information. The communications system 150 may permit data to be exchanged with a network, system, computer, and/or other components described above.

Computer system 200 may also include software elements, such as an operating system and/or other code. It should be appreciated that alternate embodiments of computer system 200 may have numerous variations from the above described components. For example, customized hardware might also be used and/or particular elements might be implemented in hardware, software (including portable software, such as applets), or both. Further, connection to the other computing devices such as network input/output and data acquisition devices may also occur.

Software of computer system 200 may include code for implementation and any or all of the functions of the various elements of the architecture as described herein. For example, computer system 200 may be configured to execute a web-based application 242 within a web browser 240. Web-based application 242 and web browser 240 may be the same or similar to web-based application 142 and web browser 140, respectively, as described above. Web browser 240 may be a software application for accessing information on the internet. For example, web browser 240 may be a browser-based application and/or an internet/web browser application, such as, and not limited to, Mozilla Firefox, Internet Explorer, Google Chrome, Safari, Netscape Navigator, and other software applications that may retrieve, present, and/or traverse information resources, such as a web page, image, video, or other piece of content identified by a uniform resource identifier ("URI" or "URL"), on the World Wide Web.

Web-based application 242 may be executed within web browser 240. Web-based application 242 may be an application software that runs on a web server. Web-based application 242 may be accessed by a user through web browser 250 with an active internet connection. In some embodiments, web-based application 242 may be or be implemented by one or more applets. In one example, web-based application 242 may be a JavaScript or Java applet. Web-based application 242 may also be implemented through other interfaces, such as DHTML, Flash, Silverlight, or other technologies. Web-based application 242 may be a background process or program running continuously and/or concurrently with a main program or process in a foreground of a session. In other embodiments, web-based application 242 may be started and/or stopped selectively by a user and/or an event, such as a login event.

Web-based application 242 may include an interface 244 and an encryption engine 246. Interface 244 may include a user interface which is presented to a user on display 270 and into which the user may provide input and receive output from web-based application 242. Interface 244 may be coupled with encryption engine 246. Encryption engine 246 may encrypt data input into interface 244 by a user. For example, if sensitive data is input into a data field provided by interface 244, encryption engine 246 may encrypt the sensitive data in the data field as it is input. Encryption engine 246 may encrypt data input into interface 244 in real-time, for example, for each keystroke entry received by interface 244 from input device 260. As described in greater detail below, encryption engine 246 may utilize one or more encryption algorithms to encrypt data input into interface 244. While the following discussion involves an asymmetrical encryption system, such as a public-private key pair system, the following systems and techniques may involve other encryption systems.

Web browser assigned memory 232 may serve as storage for web-based application 242. For example, a portion of web browser assigned memory 232 may be, for example, a browser cache. In some embodiments, web browser assigned memory 232 may store an encryption algorithm and associated data utilized by encryption engine 246. For example, when a public-private key pair system is utilized by encryption engine 246, web browser assigned memory 232 may store the encryption library, a public key, and an associated identifier. In some embodiments, a new encryption algorithm and associated data (e.g., encryption library, public key, identifiers, etc.) may be stored in web browser assigned memory 232 for each new user session initiated on web-based application 242. In other words, for each user session established on web-based application 242, web-based application 242 may import a new encryption algorithm and/or associated data to web browser assigned memory 232.

As noted above, encryption engine 246 may encrypt sensitive data entered into data fields provided by interface 244. Encryption engine 246 may encrypt the sensitive data in real-time as a user enters a keystroke. Specifically, as used herein, real-time encryption means that as the keystroke is entered by a user, received from the input device, and provided to web-based application 242, the encryption process is run, encrypting the keystroke as the user actively enters the data before the keystroke is stored in an encrypted form to the web-browser assigned memory 232. In some embodiments, encryption engine 246 may encrypt each keystroke entry of sensitive data before the keystroke entry reaches the web-browser assigned memory 232. Web browser assigned memory 232 may be part of system memory 230 and may include memory specifically assigned to web browser 240.

Figure 2B:
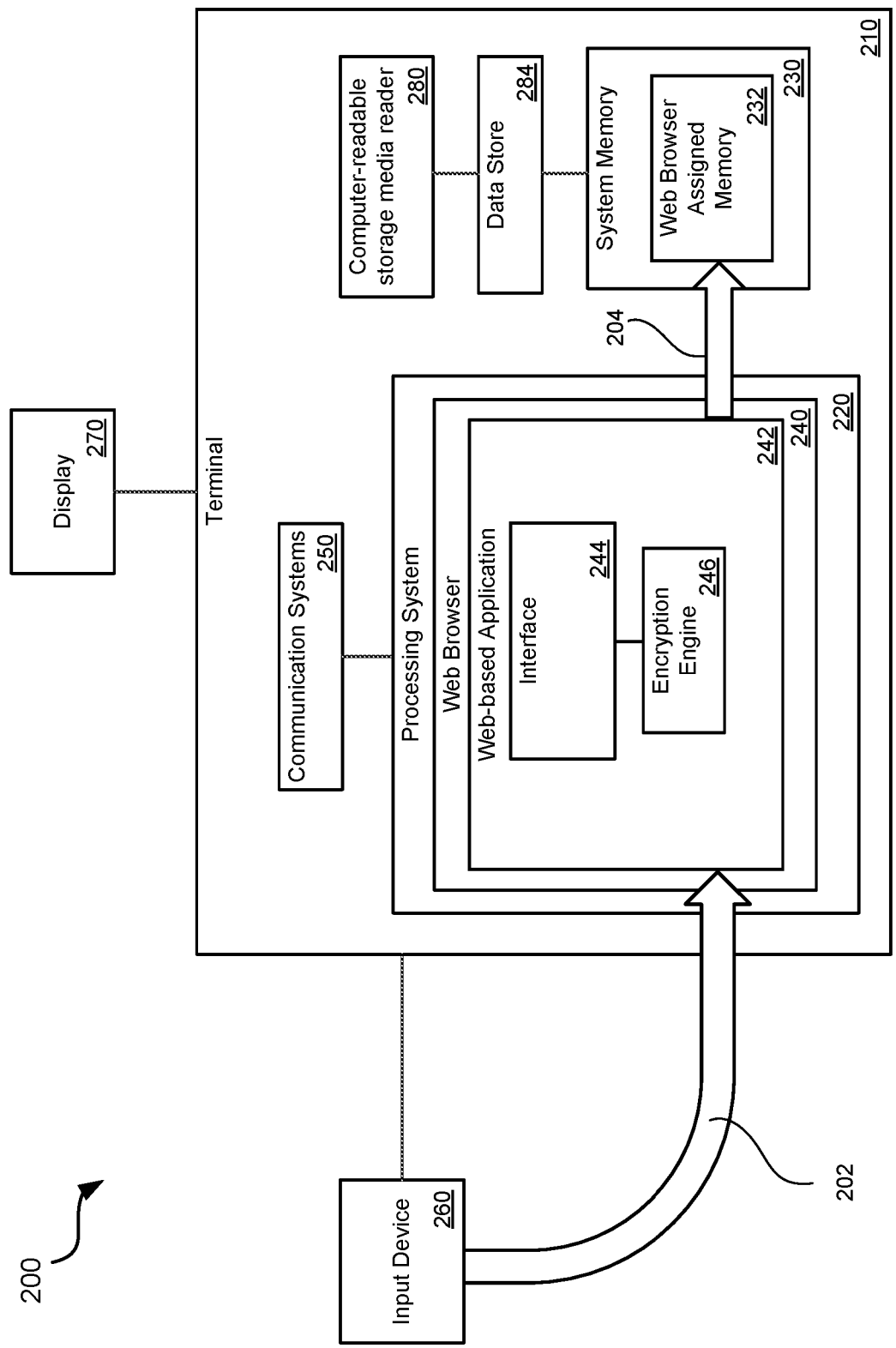
FIG. 2B illustrates a data flow for a computer system executing, within a web browser, a web-based application for protecting data input to the web-based application, according to some embodiments described herein.

Conventional encryption techniques often involve transmitting data input into a web-based application to a web browser assigned memory prior to encrypting the input data. FIG. 2B, however, illustrates an exemplary encryption method described herein, in which data input into web-based application 242 is encrypted by encryption engine 246 prior to reaching web browser assigned memory 232. FIG. 2B depicts a data flow for computer system 200 executing web-based application 242 within web browser 240 for protecting data input to the web-based application 242, according to some embodiments described herein.

When web browser 240 executes web-based application 242 and a user may input data into interface 244 of web-based application 242 using input device 260. For example, input device 260 may be a keyboard, a touchscreen, a microphone, a mouse, or a card reader. When data is input into interface 244, the input data may transfer via flow 202 from the input device to encryption engine 246 of web-based application 242. As described in further detail below, not all of data input to interface 244 may be directed via flow 202. Instead, only input data identified and tagged as sensitive may follow flow 202.

Once the data input into interface 244 is received by encryption engine 246, encryption engine 246 may encrypt the input data. Encryption engine 246 may encrypt each keystroke entry of the input data (e.g., each character individually) as it is received by encryption engine 246. In other embodiments, encryption engine 246 may encrypt the entire string entry of input data (e.g., all the characters of the input data) or a portion (e.g., a segment of characters) of the input data. As used herein, keystroke entry may mean both an individual character, a portion of characters, or an entire string entry of input data identified as sensitive.

After the keystroke entry is encrypted by encryption engine 246 to generate an encrypted entry, the encrypted entry may be transmitted via flow 204 to web browser assigned memory 232. The encrypted entry may be stored by web browser 240 in web browser assigned memory 232. Importantly, the keystroke entry may never be stored in web browser assigned memory 232, or elsewhere in system memory 230, in an unencrypted form.

Figure 3A:
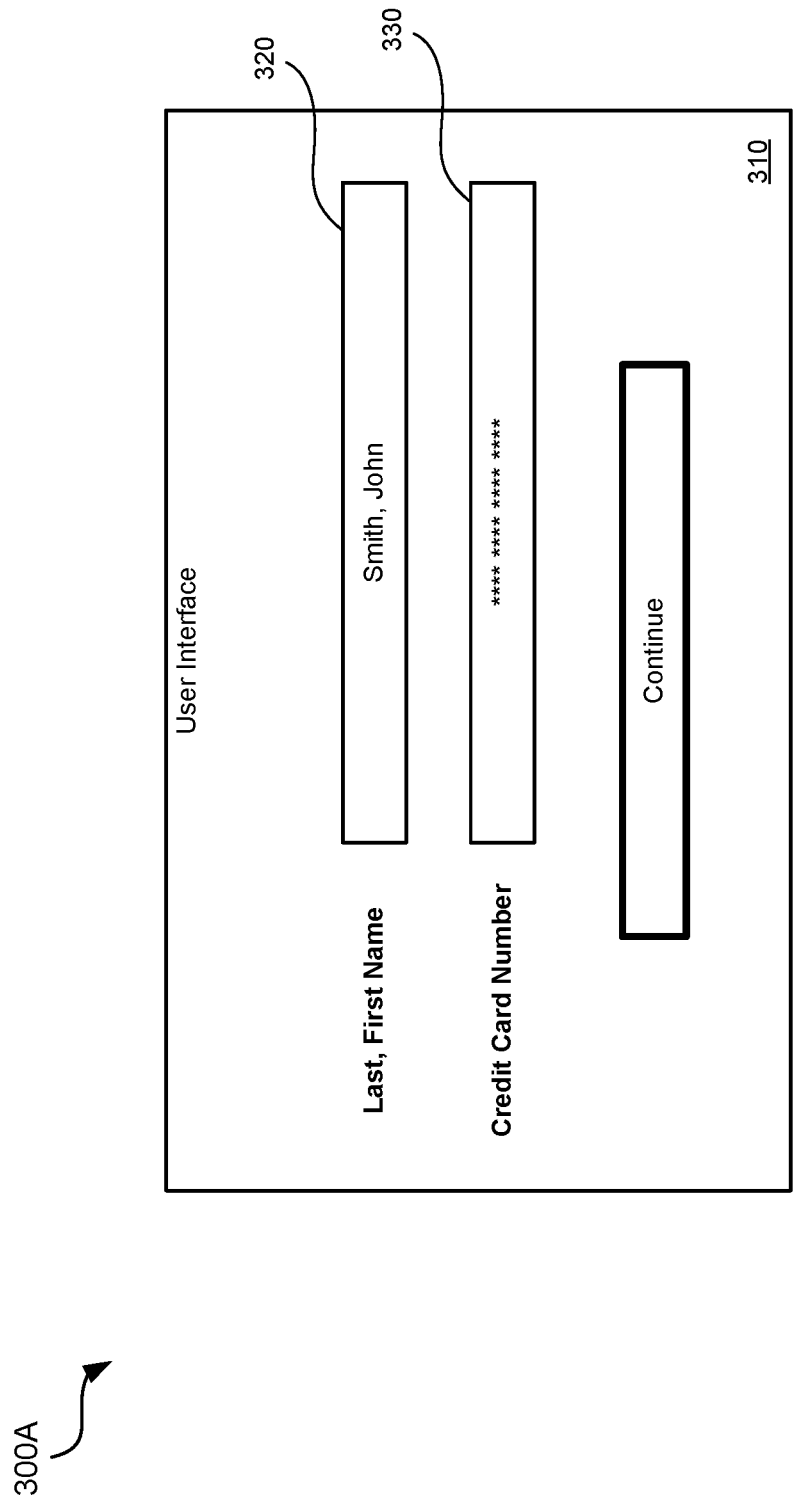
FIG. 3A illustrates data input into a user interface of a browser executing a web-based application for protecting data input to the web-based application, according to some embodiments described herein.

As each keystroke entry is identified and received by web-based application 242, a representation of the keystroke entry may be presented to the user in the respective data field on interface 244. FIG. 3A illustrates view 300A of a user interface 310, which may be the same or similar to interface 244, of a web-based application, such as web-based application 242, for protecting data input to the web-based application, according to some embodiments described herein. View 300A may depict an initial presentation of user interface 310 after a user has input data into the web-based application but before decryption has occured. For ease of discussion, the following description of FIGS. 3A and 3B may make reference to computer system 200.

As mentioned above, not all of data input into web-based application 242 may be encrypted via encryption engine 246. Instead, only data input into data fields that are tagged as sensitive may be encrypted. As part of the encryption techniques described herein, web-based application 242 may identify and tag one or more data fields as sensitive. Sensitive data fields may include data fields for receiving financial information, such as account number, credit card or debit card information, banking information, and the like, or personally identifiable information, such as a name, an address, a social security number, a phone number, and the like. Exemplary data fields that may be tagged as sensitive include a credit card number data field, a debit card number data field, a gift card or promo code data field, a bank account number data field, a password data field, or a personal information data field.

As depicted, user interface 310 may include one or more data fields 320 and 330. In the exemplary embodiment provided by view 300A, data field 330 may be identified as sensitive. Here, data field 330 may be identified as sensitive because it requires a user to input a credit card number, which is considered sensitive information. As used herein, sensitive information may include information or data that a user or agent of web-based application 242 may desire to keep confidential or hidden from discovery. For example, a user may desire to keep financial and personally identifiable information confidential due to security concerns. An agent of web-based application 242, such as a merchant, may desired to keep financial and personally identifiable information confidential due to similar security concerns as well as compliance regulations. For example, discovery of sensitive data may expose an agent to compliance violations such as PII or PCI violations.

When a data field is identified as sensitive, the data field may be tagged as sensitive, such as depicted by data field 330. Once data field 330 is tagged as sensitive, any data input into data field 330 may be masked or altered for presentation on user interface 310. For example, as depicted, each keystroke entry entered by a user into data field 330 may be presented as an asterisk on user interface 310. Various representations of a keystroke entry may be presented in data field 300 to hide the actual characters of the keystroke entry. As used herein, a representation of a keystroke entry may be understood as any presentation of symbols, characters, images, and the like, which obscure the actual characters of a keystroke entry entered into data field 330.

User interface 310 may also include non-sensitive data fields, such as data field 320. Data field 320 may receive information or data that is not considered sensitive, such as for example, a name or username. Per view 300A, data field 320 may receive a first and last name of a customer or user. Because the data input into data field 320 is not considered sensitive, the characters corresponding to the data input may be presented as they are entered, in an unmarked and clear form. Here, the user's name is John Smith, which the web-based application 242 has not tagged as sensitive, and thus is clearly visible on user interface 310 in clear form.

Figure 3B:
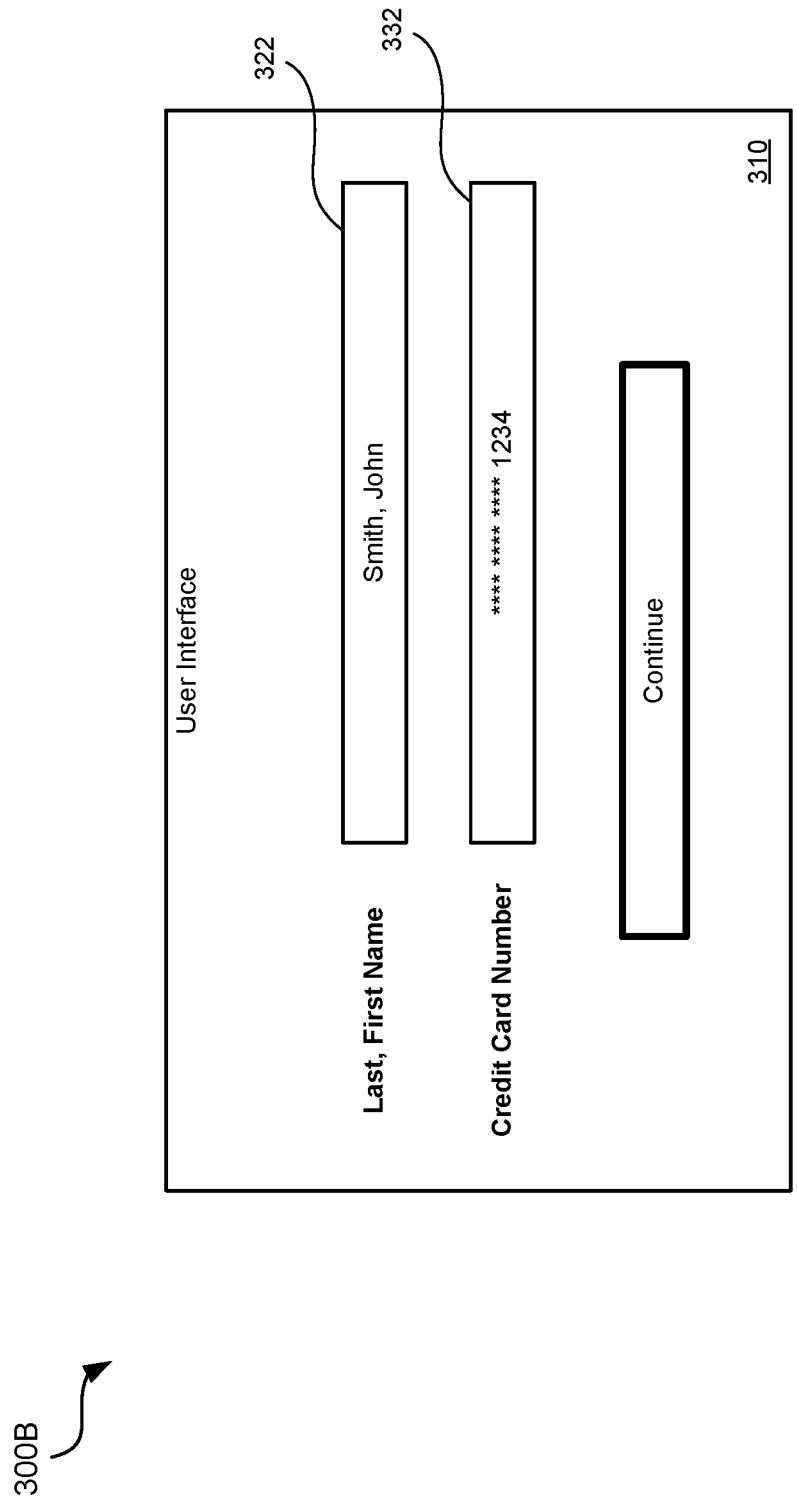
FIG. 3B illustrates a sensitive representation of a portion of a decrypted entry presented on a user interface of a browser executing a web-based application for protecting data input to the web-based application, according to some embodiments described herein.

In some embodiments, it may be desirable to mask sensitive data even after decryption. FIG. 3B illustrates view 300B of interface 310 after decryption has occurred. After a decryption process has occurred, which will be described in greater detail below, it may be desirable to obscure the decrypted information for presentation on user interface 310. When a portion of a decrypted entry is tagged as sensitive, a sensitive representation of the portion of the decrypted entry may be presented (e.g., displayed) on user interface 310 in a corresponding data field. For example, as depicted, a decrypted entry may include a credit card number. A remote server system may determine that a portion of the credit card number is sensitive and thus may generate a sensitive representation of the credit card number, which as shown, may include masking the first 12 digits of the credit card number while displaying the last four digits. The sensitive representation may be presented on user interface 310 in corresponding data field 332.

Similar to view 300A, in some cases a decrypted entry may not be tagged as sensitive. In such cases, the decrypted entry may be presented on user interface 310 in the clear (e.g., without masking or alteration). For example, if the decrypted entry included the first and last name of a customer, here John Smith, which the remote server system did not tag as sensitive, then the customer's name, John Smith, may be displayed in clear form in its corresponding data field 322 of interface 310. The determination of whether decrypted data contains sensitive information is described in more detail below.

Figure 4A:
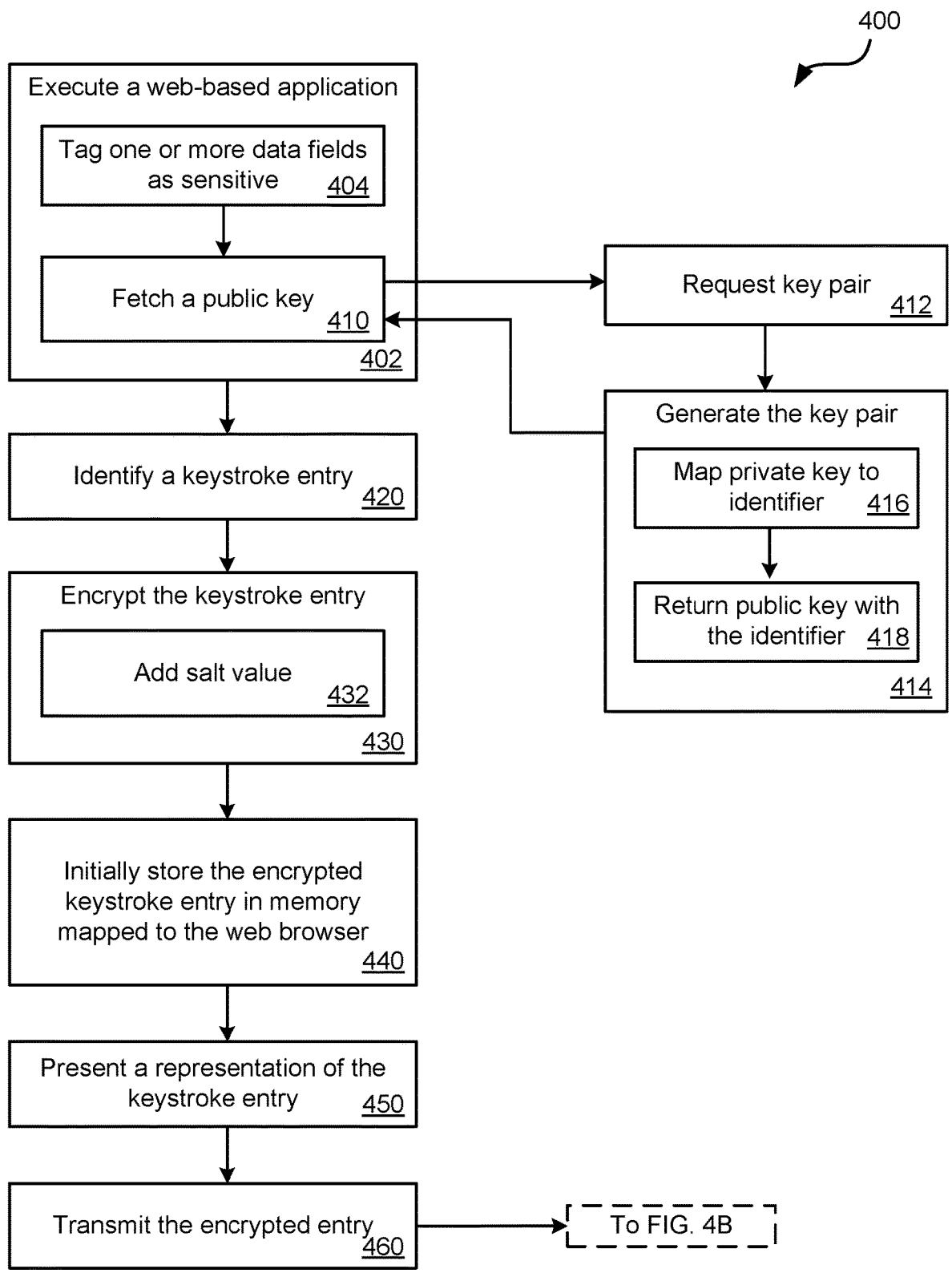
FIGS. 4A-4C illustrates a method for protecting data input to a web-based application, according to some embodiments described herein.
Figure 4B:
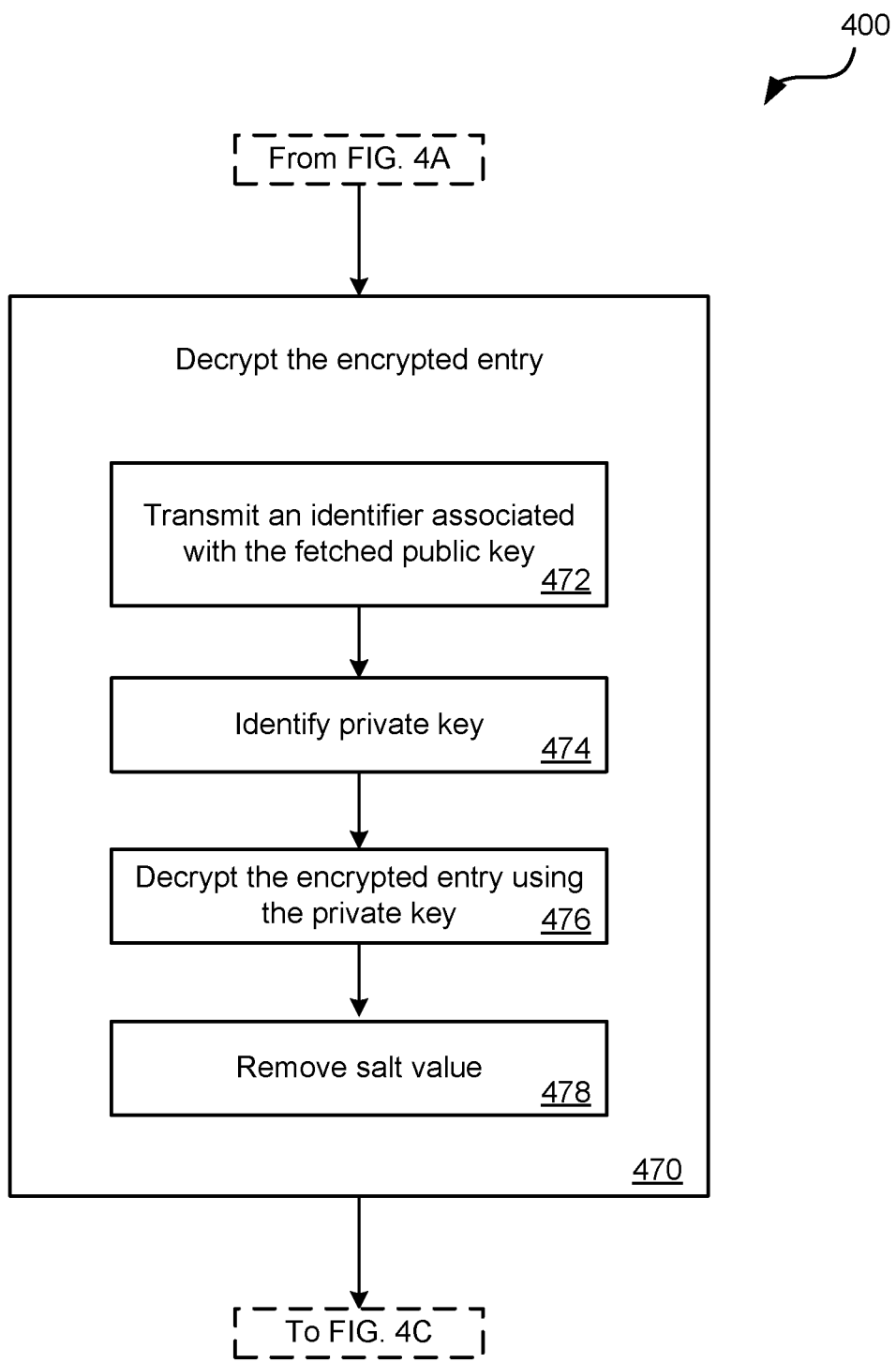
Figure 4C:
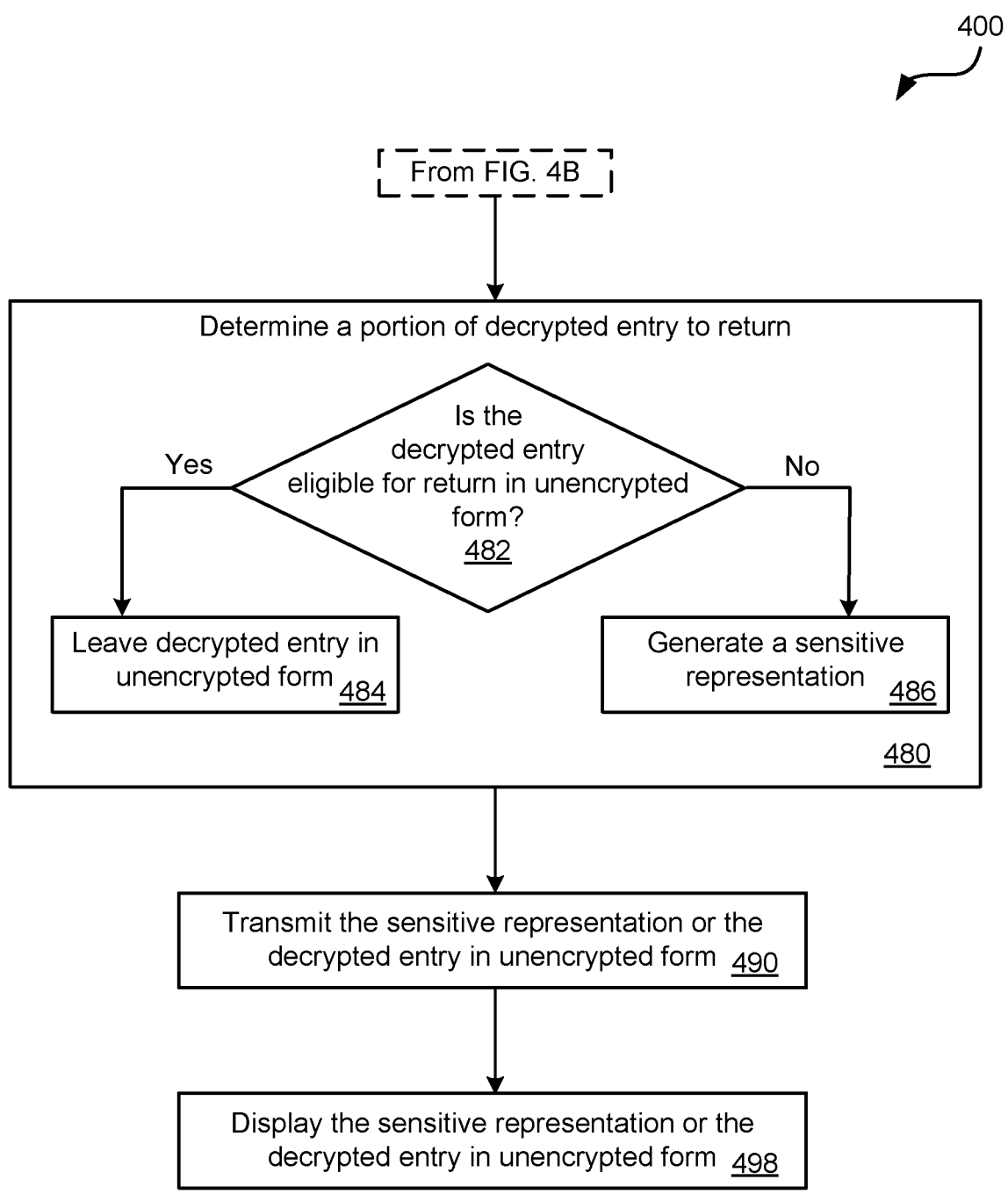

Referring now to FIGS. 4A-4C, a flow diagram depicts method 400 for protecting data input to a web-based application, according to some embodiments described herein. Method 400 may be implemented by system 100 to protect data input into computer system 200. For ease of discussion, description of method 400 may include references to FIGS. 1, 2A, and 2B. It is contemplated that any of the steps shown in method 400 may be optional and/or rearranged, and that method 400 may include additional steps, intermediate or otherwise, not shown in the present illustration.

Method 400 may include step 402. At step 402, a web-based application, such as web-based application 242, may be retrieved from a respective website and executed. The web-based application may be executed by a web browser, such as web browser 240. In some embodiments, the web-based application may be executed upon an initiation event. For example, an initiation event may include the startup or selection of the web-based application, the web browser, or a login event. The initiation event may be user initiated or automatically initiated by a computer system, such as computer system 200. In some embodiments, a login event may include a user logging into a prepaid service which includes the encryption features of web-based application as described herein.

Step 402 may include steps 404 and 410. At step 404, after the web browser has executed the web-based application, the web-based application may tag one or more data fields as sensitive. As described above, one or more data fields presented on a user interface, such as user interface 310, may be identified and subsequently tagged as sensitive. A user interface may include one or more data fields that are tagged as sensitive and/or one or more data fields that are not identified as sensitive. For example, in some embodiments the code downloaded as part of the web-based application, certain data fields may be tagged as sensitive while other data fields may not be tagged as sensitive.

At step 410, a public key may be fetched. In some embodiments, a public key may be fetched after one or more data fields of the user interface are tagged as sensitive by the web-based application. In other embodiments, the public key may be fetched after a user selects the one or more data fields that are tagged as sensitive.

In some embodiments, step 410 may include substeps 412, 414, 416, and 418. To fetch a public key, the web-based application may request a public key from a remote server system, such as remote server system 180. At step 412, the remote server system may request a key pair from a key management system, such as key management system 190. The key pair may include a public key and a corresponding private key for an asymmetric encryption algorithm, as discussed previously. Upon request by the remote server system, the key management system may generate a key pair at step 414. In some embodiments, the key management system may generate a new key pair for each user session of the web-based application. In other embodiments, a new key pair may be generated for each new login event at web-based application. While in still other embodiments, a new key pair may be generated each time new data is input into a data field tagged as sensitive.

In other embodiments, the web-based application may not separately request a public key from the remote server system. Instead, when the web-based application is executed within the web-browser, the code associated with the web-based application may include an embedded public key. In such embodiments, the web-based application may not need to separately request the public key.

In some embodiments, step 414 may include steps 416 and 418. As part of generating a new key pair, the key management system may map a private key to an identifier, at step 416. The identifier may be transmitted along with the public key back to the web-based application, via the remote server system, at step 418. The identifier may be transmitted along with the public key such to allow identification of a corresponding private key during a decryption process. In some embodiments, the key management system may store the private key and associated identifier in a data store, such as data store 194.

Method 400 may also include step 420. At step 420, the web-based application may identify a keystroke entry being input into the one or more data fields tagged as sensitive. As previously discussed, a keystroke entry may include data input by a user at a user interface of the web-based application using one or more input devices, such as input device 260. The keystroke entry may be a manual press of a keypad on a keyboard or may be a vocalization of a character in a voice-to-text recognition system. While in still other embodiments, a keystroke entry may include an input of a magnetic card reader.

After the web-based application identifies a keystroke entry being input into the one or more data fields tagged as sensitive, the web-based application may encrypt the keystroke entry, at step 430. The web-based application may encrypt the keystroke entry as it is input by the user at the user interface. Importantly, the web-based application encrypts the keystroke entry prior to storing the keystroke entry in memory mapped to the web browser, such as web browser assigned memory 232. The web-based application may encrypt the keystroke entry using an encryption engine, such as encryption engine 246. In some embodiments, the encryption engine may user a public key to encrypt the keystroke entry. Optionally, a salt value may be added to the keystroke entry as part of the encryption process, at step 432. The addition of the salt value to the keystroke entry may prevent reverse engineering of the input data. The salt value may be a randomly selected number of a predefined length that is added to the keystroke entry at a predefined location prior to encryption. Since the predefined length and location in relation to the keystroke is known by the remote server system, the salt value can be removed during or post the decryption process. In some embodiments, a salt value may be added to the keystroke entry prior to encryption using the public key. In other embodiments, the keystroke entry may be encrypted prior to addition of a salt value or no salt value may be added during the encryption process.

After the keystroke entry is encrypted to generate an encrypted entry, then the encrypted entry may be stored in the memory mapped to the web browser, at step 440. As noted before, the keystroke entry may never be stored to memory of the web browser in an unencrypted form and, in some embodiments, only the encrypted entry may be stored to the memory of the web browser.

To preserve the confidentiality of the keystroke entry input into the one or more data fields tagged as sensitive, a representation of the keystroke entry may be presented by the web browser in the data field tagged as sensitive, at step 450. For example, the web-based application may generate a representation of the keystroke entry as it is being input into the sensitive data field, and the web browser may present the representation in the sensitive data field. An exemplary representation is the representation illustrated in data field 330 of FIG. 3A. Presenting the representation of the keystroke entry at step 450 may include displaying the representation to a user using one or more output devices, such as display 270.

Method 400 may further include step 460, at which the encrypted entry may be transmitted to a remote server system, such as remote server system 180. The encrypted entry may be transmitted via the web-based application to the remote server system.

In some embodiments, method 400 may further include step 470, which is depicted on FIG. 4B. At step 470, the encrypted entry may undergo a decryption process. For example, the remote server system may decrypt the decrypted entry to generate a decrypted entry. To decrypt the encrypted entry, step 470 may further include substeps 472, 474, 476, and/or 478. At step 472, the web-based application may transmit an identifier associated with the fetched public key used to generate the encrypted entry. In an alternative point-of-view, at step 472, the remote server system may receive the identifier associated with the fetched public key. In some embodiments, the identifier may be transmitted along with the encrypted entry from the web-based application to the remote server system, while in other embodiments, the identifier may be transmitted separately from the encrypted entry. In some cases, separate transmission of the identifier and the encrypted entry may increase the security of the encryption process.

At step 474, the remote server system may identify a private key associated with the fetched public key using the identifier. In some embodiments, the key management system of the remote server system may identify the private key using the identifier. For example, the key management system may perform a look-up using the identifier to determine the respective private key within data store 194.

After the associated private key has been identified at step 474, the encrypted entry may be decrypted using the private key, at step 476. At step 476, the encrypted entry may be decrypted using the private key by the remote server system to generate a decrypted entry. For example, the remote server system may include a decryption engine, such as decryption engine 184. The decryption engine may use the private key to decrypt the encrypted entry. In some embodiments, decrypting the encrypted entry may include removing a salt value, at step 478. Depending on the sequence of the salt value addition and encryption, the encrypted entry may be decrypted using the private key to generate a decrypted entry before removing the salt value from the decrypted entry or the salt value may be remove from the encrypted entry before decryption using the private key. As noted previously, the remote server system may store information indicating the predefined length and location of the salt value in relation to the keystroke. Accordingly, the remote server system can identify and remove the salt value during or post the decryption process. In some embodiments, the decrypted entry may be stored by the remote server system in, for example, data store 186.

In some embodiments, method 400 may further include step 480. At step 480, a determination 482 of a portion of decrypted entry to return to the web-based application may be made by the remote server system. As previously discussed with reference to FIG. 3B, in some embodiments it may be desirable to maintain confidentiality of the decrypted entry. At step 480, the remote server system may determine whether a portion of the decrypted entry is eligible for return in an unencrypted form (e.g., in the clear form). In some embodiments, certain types of data may be eligible for return to the web-based application in an unencrypted form, while other types of data may be eligible for return to the web-based application only in a masked or altered form. For example, the determination of whether the decrypted entry is eligible for return in an unencrypted form may be based on the data field into which the associated keystroke entry was made. In other embodiments, the remote server system may identify the type of data of the decrypted entry and make the determination based on the identified data type. For example, an analysis may be performed on the data input by the user. If the input data is determined to correspond to a credit card number based upon a string of numbers present within the input data, the entirety of the credit card number may not be eligible to be returned in an unencrypted form. Instead, the remote server system may identify only a portion, such as the last four digits, of the decrypted entry as eligible for return to the web-based application in unencrypted form. The rest of the credit card number may require masking or alteration, and thus be presented to a user as a sensitive representation.

At step 486, if a determination is made that the decrypted entry is not eligible for return in an unencrypted form, then the remote server system may generate a sensitive representation. As discussed with reference to FIG. 3B, the sensitive representation may be any means of masking or obscuring a portion or all of the decrypted entry. For example, in the case of a credit card number, a sensitive representation may be the first 12 digits presented as asterisks while the last four digits are in clear form. If a determination is made that the decrypted entry is eligible for return in unencrypted form, then the decrypted entry may be left in unencrypted form at step 484.

In some embodiments, the remote server system may use the decrypted entry to lookup or determine information associated with the decrypted entry. For example, if the decrypted entry corresponds to a debit card number, the decrypted entry may be used to lookup an account number associated with the debit card number. In some embodiments, instead of returning the decrypted entry to the web-based application, the information associated with the decrypted entry may be returned to the web-based application. In such embodiments, a similar determination to step 480 may be made with respect to the information associated with the decrypted entry. For example, instead of sending back the debit card number, the remote server system may return the account number associated with the debit card number. However, the remote server system may determine that at least a portion of the account number is sensitive and may generate a sensitive representation of the account number. Then, instead of returning the account number to the web-based application, the sensitive representation of the account number may be returned to the web-based application instead.

At step 490, the remote server system may transmit the sensitive representation of the decrypted entry or the decrypted entry in unencrypted form, depending on the determination at step 480, to the web-based application. Upon receipt of the sensitive representation, the web-based application may display the sensitive representation on the user interface, for example as depicted by data field 332 on user interface 310. Similarly, in cases where the decrypted entry is returned to the web-based application in unencrypted form, the web-based application may display the decrypted entry in unencrypted form on the user interface.

In the above description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations.

Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, models, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for protecting data input to a web-based application, the method comprising:
    executing, within a web browser being executed by a computer system, a web-based application, wherein the web-based application is accessed through the web browser and executing the web-based application comprises:
        automatically differentiating, in code downloaded as part of accessing the web-based application, one or more data fields as sensitive from one or more other data fields as not sensitive;
        tagging the one or more data fields as sensitive; and
        fetching a public key from a remote server system;
    identifying, by the web-based application being executed within the web browser, a keystroke entry being input to the one or more data fields tagged as sensitive within the web-based application;
    prior to storing the keystroke entry in memory mapped to the web browser, encrypting, by the web-based application being executed within the web browser, the keystroke entry using the fetched public key to generate an encrypted entry;
    storing, by the web browser, the encrypted entry to memory, wherein the keystroke entry is never stored to memory of the computer system in an unencrypted form;
    presenting, by the web browser, a representation of the keystroke entry in the data field tagged as sensitive;
    transmitting, by the web-based application being executed within the web browser, the encrypted entry to the remote server system; and
    receiving, by the web-based application being executed within the web browser, a portion of the encrypted entry that has been decrypted and determined eligible for return to the web-based application in unencrypted form by the remote server system, wherein the determination that the portion of the encrypted entry is eligible for return in unencrypted form is based on a type of data entered into the one or more data fields.

2. The method for protecting data input to the web-based application of claim 1, wherein the encrypting, by the web-based application being executed within the web browser, the keystroke entry using the fetched public key to generate the encrypted entry comprises:
    adding a salt value to the keystroke entry to form the encrypted entry.

3. The method for protecting data input to the web-based application of claim 1, the method further comprising:
    decrypting, by the remote server system, the encrypted entry to generate a decrypted entry;
    transmitting, by the remote server system, the portion of the decrypted entry to the web-based application.

4. The method for protecting data input to the web-based application of claim 3, further comprising:
    transmitting, by the web-based application being executed within the web browser, an identifier associated with the fetched public key along with the encrypted entry to the remote server system;
    identifying, by the remote server system, a private key based on the identifier associated with the fetched public key;
    using, by the remote server system, the private key to decrypt the encrypted entry to generate the decrypted entry; and
    removing, by the remote server system, a salt value from the decrypted entry.

5. The method for protecting data input to the web-based application of claim 3, further comprising:
    tagging, by the remote server system, the portion of the decrypted entry as sensitive; and
    generating, by the remote server system, a sensitive representation of the portion of the decrypted entry;
    where the transmitting, by the remote server system, the portion of the decrypted entry to the web-based application comprises transmitting the sensitive representation of the portion of the decrypted entry to the web-based application.

6. The method for protecting data input to the web-based application of claim 1, wherein the fetching the public key from the remote server system comprises:
    requesting, by the remote server system, a key pair from a key management system, wherein the key pair comprises the public key and a corresponding private key;
    generating, by the key management system, the key pair; and
    transmitting, by the remote server system, the public key to the web-based application being executed within the web browser.

7. The method for protecting data input to the web-based application of claim 1, wherein the one or more data fields tagged as sensitive is selected from the group consisting of:
 a credit card number data field;
 a bank account number data field; and
 a password data field.

8. A system for protecting data input to a web-based application, the system comprising:
 one or more processors; and
 memory readable by the one or more processors and that stores therein a set of instructions which, when executed by the one or more processors, causes the system to perform operations comprising:
  executing, within a web browser being executed by the system, a web-based application, wherein the web-based application is accessed through the web browser and executing the web-based application comprises:
   automatically differentiating, in code downloaded as part of accessing the web-based application, one or more data fields as sensitive from one or more other data fields as not sensitive;
   tagging the one or more data fields as sensitive; and
   fetching a public key from a remote server system;
  identifying, by the web-based application being executed within the web browser, a keystroke entry being input to the one or more data fields tagged as sensitive within the web-based application;
  prior to storing the keystroke entry in memory mapped to the web browser, encrypting, by the web-based application being executed within the web browser, the keystroke entry using the fetched public key to generate an encrypted entry;
  storing, by the web browser, the encrypted entry to memory, wherein the keystroke entry is never stored to memory of the system in an unencrypted form;
  presenting, by the web browser, a representation of the keystroke entry in the data field tagged as sensitive;
  transmitting, by the web-based application being executed within the web browser, the encrypted entry to the remote server system; and
  receiving, by the web-based application being executed within the web browser, a portion of the encrypted entry that has been decrypted and determined eligible for return to the web-based application in unencrypted form by the remote server system, wherein the determination that the portion of the encrypted entry is eligible for return in unencrypted form is based on a type of data entered into the one or more data fields.

9. The system for protecting data input to the web-based application of claim 8, wherein the encrypting, by the web-based application being executed within the web browser, the keystroke entry using the fetched public key to generate the encrypted entry comprises:
 adding, by the web-based application being executed within the web browser, a salt value to the keystroke entry to form the encrypted entry.

10. The system for protecting data input to the web-based application of claim 8, wherein the system further comprises the remote server system, wherein the remote server system is configured to:
 decrypt the encrypted entry to generate a decrypted entry; and
 transmit the portion of the decrypted entry to the web-based application.

11. The system for protecting data input to the web-based application of claim 10, wherein the remote server system is further configured to:
 receive an identifier associated with the fetched public key along with the encrypted entry;
 identify a private key based on the identifier associated with the fetched public key;
 use the private key to decrypt the encrypted entry to generate the decrypted entry; and
 remove a salt value from the decrypted entry.

12. The system for protecting data input to the web-based application of claim 10, wherein the remote server system is further configured to:
 tag the portion of the decrypted entry as sensitive; and
 generate a sensitive representation of the portion of the decrypted entry;
 where the transmitting the portion of the decrypted entry to the web-based application comprises transmitting the sensitive representation of the portion of the decrypted entry to the web-based application.

13. The system for protecting data input to the web-based application of claim 8, wherein the system further comprises the remote server system, wherein the remote server system is configured to:
 request a key pair from a key management system, wherein the key pair comprises the public key and a corresponding private key; and
 transmit the public key to the web-based application being executed within the web browser.

14. The system for protecting data input to the web-based application of claim 8, wherein the one or more data fields tagged as sensitive is selected from the group consisting of:
 a credit card number data field;
 a bank account number data field; and
 a password data field.

15. A non-transitory, processor-readable medium, comprising processor-readable instructions configured to cause one or more processors to:
 execute, within a web browser, a web-based application, wherein the web-based application is accessed through the web browser and executing the web-based application comprises:
  automatically differentiating, in code downloaded as part of accessing the web-based application, one or more data fields as sensitive from one or more other data fields as not sensitive;
  tagging the one or more data fields as sensitive; and
  fetching a public key from a remote server system;
 identify, by the web-based application being executed within the web browser, a keystroke entry being input to the one or more data fields tagged as sensitive within the web-based application;
 prior to storing the keystroke entry in memory mapped to the web browser, encrypt, by the web-based application being executed within the web browser, the keystroke entry using the fetched public key to generate an encrypted entry;
 store, by the web browser, the encrypted entry to memory, wherein the keystroke entry is never stored to memory communicatively coupled to the one or more processors in an unencrypted form;
 present, by the web browser, a representation of the keystroke entry in the data field tagged as sensitive;
 transmit, by the web-based application being executed within the web browser, the encrypted entry to the remote server system; and receive, by the web-based application being executed within the web browser, a portion of the encrypted entry that has been decrypted and determined eligible for return to the web-based application in unencrypted form by the remote server system, wherein the determination that the portion of the encrypted entry is eligible for return in unencrypted form is based on a type of data entered into the one or more data fields.

16. The non-transitory, processor-readable medium of claim 15, wherein the encrypting, by the web-based application being executed within the web browser, the keystroke entry using the fetched public key to generate the encrypted entry comprises:

adding a salt value to the keystroke entry to form the encrypted entry.

17. The non-transitory, processor-readable medium of claim 15, wherein the processor-readable instructions further cause the one or more processors to:

decrypt the encrypted entry to generate a decrypted entry; and transmit the portion of the decrypted entry to the web-based application.

18. The non-transitory, processor-readable medium of claim 17, wherein the processor-readable instructions further cause the one or more processors to:

transmit, by the web-based application being executed within the web browser, an identifier associated with the fetched public key along with the encrypted entry to the remote server system;

identify a private key based on the identifier associated with the fetched public key;

use the private key to decrypt the encrypted entry to generate the decrypted entry; and remove a salt value from the decrypted entry.

19. The non-transitory, processor-readable medium of claim 17, wherein the processor-readable instructions further cause the one or more processors to:

tag the portion of the decrypted entry as sensitive; and generate a sensitive representation of the portion of the decrypted entry;

where the transmitting the portion of the decrypted entry to the web-based application comprises transmitting the sensitive representation of the portion of the decrypted entry to the web-based application.

20. The non-transitory, processor-readable medium of claim 15, wherein the one or more data fields tagged as sensitive is selected from the group consisting of:

a credit card number data field;

a bank account number data field; and a password data field.

* * * * *